United States Patent
Ohta

(10) Patent No.: US 7,248,733 B2
(45) Date of Patent: Jul. 24, 2007

(54) COLOR-IMAGE PROCESSING APPARATUS AND METHOD, AND STORAGE MEDIUM

(75) Inventor: Ken-Ichi Ohta, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 142 days.

(21) Appl. No.: 11/113,138

(22) Filed: Apr. 25, 2005

(65) Prior Publication Data

US 2005/0213138 A1 Sep. 29, 2005

Related U.S. Application Data

(62) Division of application No. 09/557,912, filed on Apr. 21, 2000, now Pat. No. 6,975,757.

(30) Foreign Application Priority Data

Apr. 26, 1999 (JP) .................................. 11/11843

(51) Int. Cl.
    *G06K 9/00* (2006.01)
(52) U.S. Cl. ...................... 382/165; 382/137; 382/209; 382/305; 358/1.14; 358/443
(58) Field of Classification Search ................ 382/165, 382/209, 219, 278, 135, 137, 138, 140, 305; 358/1.14, 437, 443
See application file for complete search history.

(56) References Cited

U.S. PATENT DOCUMENTS 4,772,938 A      9/1988 Sasson ........................ 358/21

| | | |
|---|---|---|
| 4,897,802 A | 1/1990 | Atkinson et al. ............ 364/518 |
| 4,908,873 A | 3/1990 | Philibert et al. ............. 382/100 |
| 5,126,795 A | 6/1992 | Maruyama et al. ......... 355/251 |
| 5,157,762 A | 10/1992 | Snietka ....................... 345/589 |
| 5,162,821 A | 11/1992 | Fukuchi et al. ............. 347/118 |

(Continued)

FOREIGN PATENT DOCUMENTS

EP      0779603 A2      6/1997

(Continued)

OTHER PUBLICATIONS

"Automated Virus Protection Software Without Noticeable System Overhead", IBM Technical Disclosure Bulletin, vol. 36, No. 10, Oct. 1993, pp. 383.

(Continued)

*Primary Examiner*—Yosef Kassa
(74) *Attorney, Agent, or Firm*—Fitzpatrick, Cella, Harper & Scinto

(57) ABSTRACT

Conventionally, a color-image processing apparatus, such as a computer, or the like, cannot determine whether or not color-image data stored in an image storage device, such as a hard disk, or the like, is an image corresponding to a specific original. According to the present invention, a color-image processing apparatus includes a determination unit for comparing color-image data stored in an image storage device with a pattern stored in a pattern storage device. The color-image data stored in the image storage device is read with a predetermined timing, and determination by the determination unit is performed. The color-image processing apparatus is a computer, and the image storage device is a hard disk.

22 Claims, 3 Drawing Sheets

U.S. PATENT DOCUMENTS

| | | | |
|---|---|---|---|
| 5,216,724 A | 6/1993 | Suzuki et al. | 382/135 |
| 5,239,175 A | 8/1993 | Jawad et al. | 250/226 |
| 5,319,473 A | 6/1994 | Harrington | 358/501 |
| 5,363,454 A | 11/1994 | Udagawa et al. | 382/165 |
| 5,416,715 A | 5/1995 | Kinoshita et al. | 364/474.2 |
| 5,475,468 A | 12/1995 | Natsudaira | 399/9 |
| 5,502,575 A | 3/1996 | Kai et al. | 358/405 |
| 5,515,451 A | 5/1996 | Tsuji et al. | 382/135 |
| 5,638,496 A | 6/1997 | Sato | 356/1.9 |
| 5,659,628 A | 8/1997 | Tachikawa et al. | 382/135 |
| 5,678,155 A | 10/1997 | Miyaza | 399/366 |
| 5,724,442 A * | 3/1998 | Ogatsu et al. | 382/167 |
| 5,790,165 A | 8/1998 | Kuboki et al. | 347/257 |
| 5,909,291 A * | 6/1999 | Myers et al. | 358/523 |
| 6,014,453 A | 1/2000 | Sonoda et al. | 382/137 |
| 6,025,862 A * | 2/2000 | Thompson | 347/232 |
| 6,069,696 A | 5/2000 | McQueen et al. | 356/326 |
| 6,070,212 A * | 5/2000 | Yasuda et al. | 710/107 |
| 6,160,922 A * | 12/2000 | Hayashi | 382/274 |
| 6,268,930 B1 * | 7/2001 | Ohta et al. | 358/1.9 |
| 6,335,794 B1 | 1/2002 | Herley et al. | 358/1.14 |
| 6,427,020 B1 * | 7/2002 | Rhoads | 382/100 |
| 6,493,462 B1 * | 12/2002 | Inoue | 382/170 |
| 6,560,356 B1 * | 5/2003 | Takahashi et al. | 382/162 |
| 6,614,914 B1 * | 9/2003 | Rhoads et al. | 382/100 |
| 6,925,205 B2 * | 8/2005 | Leedham et al. | 382/167 |

FOREIGN PATENT DOCUMENTS

| | | |
|---|---|---|
| JP | 6-70159 | 3/1994 |
| JP | 11-46299 | 2/1999 |

OTHER PUBLICATIONS

"Hardware Monitor Security Feature", IBM Technical Disclosure Bulletin, vol. 32, No. 2A, Aug. 1989, pp. 284-285.

"Employment of Virus Detection Procedures at Domain Boundaries", IBM Technical Disclosure Bulletin, vol. 34, No. 7A, Dec. 1991, pp. 199-200.

* cited by examiner

COLOR-IMAGE PROCESSING APPARATUS AND METHOD, AND STORAGE MEDIUM

RELATED APPLICATION

This application is a division of U.S. application Ser. No. 09/557,912, filed Apr. 21, 2000 now U.S. Pat. No. 6,975,757.

BACKGROUND OF THE INVENTION

1. Field of the Invention

The present invention relates to a color-image processing apparatus and method, and a storage medium.

2. Description of the Related Art

Recently, color work stations and so-called personal computers have been developed in which a color-image reading apparatus utilizing a CCD (charge-coupled device), or the like, a host apparatus for performing color-image processing utilizing CAD (computer aided design) and CG (computer graphics), and a color printing apparatus, such as a color laser-beam printer, a color ink-jet printer, or the like, are combined.

In such work stations or personal computers, a multicolor image can be printed.

Accordingly, there is the possibility that a specific original for which it is prohibited to make a copy, such as paper money, securities, or the like, is easily forged by reading the original by the color-image reading apparatus, temporarily storing the read image in the work station or the personal computer, and outputting the read image by the color printing apparatus.

This problem arises because the above-described image reading apparatuses, printing apparatuses, work stations and personal computers do not have means for preventing forgery of a specific original in themselves.

SUMMARY OF THE INVENTION

It is an object of the present invention to solve the above-described problem.

It is another object of the present invention to provide a configuration in which, in a color work station, serving as a color-image processing apparatus, and a personal computer, the work station can execute determination processing for color-image data stored within the personal computer.

It is still another object of the present invention to provide new functions.

According to one aspect, the present invention which achieves these objectives, relates to a color-image processing apparatus including determination means for comparing color-image data stored in image storage means with a pattern stored in pattern storage means. The color-image data stored in the image storage means is read with a predetermined timing, and determination by the determination means is performed.

According to another aspect, the present invention which achieves these objectives, relates to a color-image processing method for comparing color-image data stored in image storage means with a pattern stored in pattern storage means includes the step of reading the color-image data stored in the image storage means with a predetermined timing, and performing determination by the determination means.

According to still another aspect, the present invention which achieves these objectives relates to a color-image processing apparatus, in which the above-described color-image processing method is executed by a computer, and the above-described image storage means is a hard disk.

According to yet another aspect, the present invention which achieves these objectives relates to a storage medium, capable of being read by a computer, including codes of a determination process for comparing color-image data stored in image storage means with a pattern stored in pattern storage means. The color-image data stored in the image storage means is read at a predetermined timing, and determination in the determination process is performed.

The foregoing and other objects, advantages and features of the present invention will become more apparent from the following description of the preferred embodiments taken in conjunction with the accompanying drawings.

DESCRIPTION OF THE PREFERRED EMBODIMENTS

First Embodiment

A first embodiment of the present invention will now be described with reference to the drawings.

Figure 1:
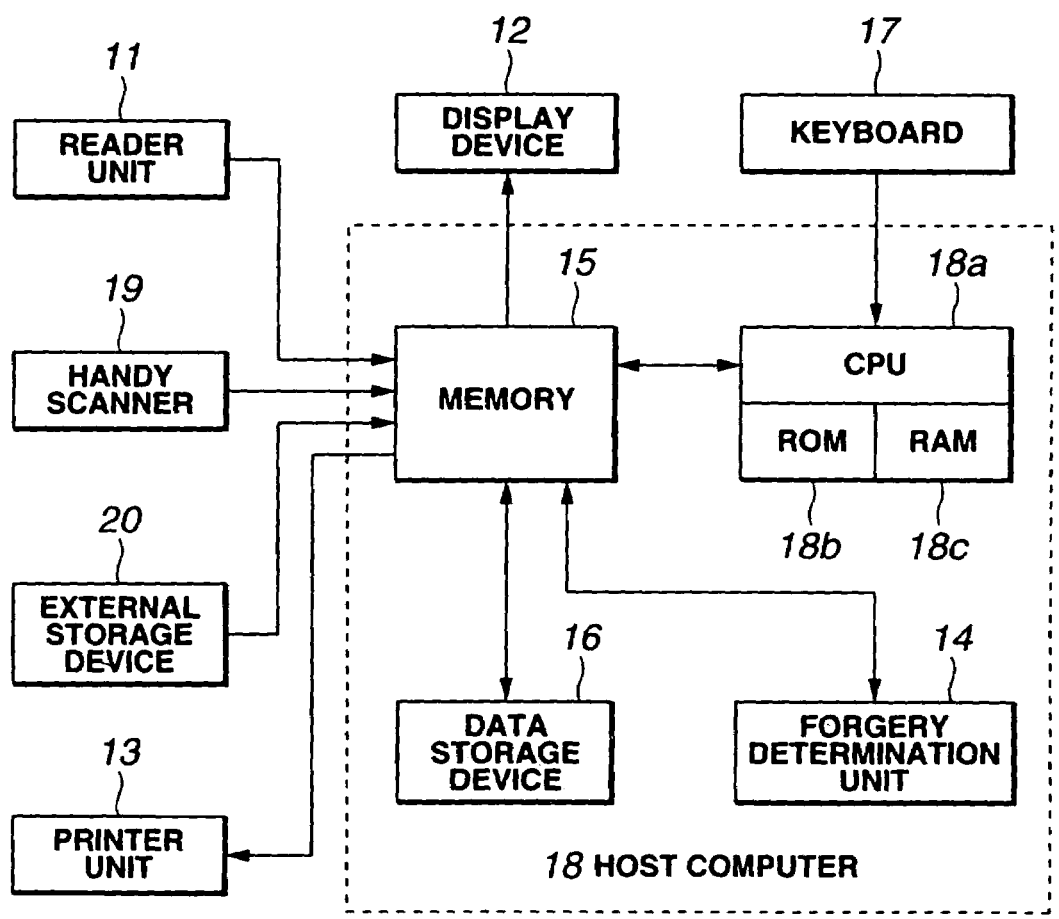
FIG. 1 is a block diagram illustrating a computer system according to a first embodiment of the present invention.

FIG. 1 is a block diagram illustrating a computer system according to the first embodiment.

In FIG. 1, reference numeral 18 represents a host computer. A reader unit 11 for inputting color-image data by optically reading an original, a handy scanner 19, an external storage device 20 for reading/writing data using a magnetooptical disk, a CD(compact disc)-ROM (read-only memory), a tape device, or the like, a keyboard 17 for performing input of various data, input of a command for instructing one of various functions, or the like, by means of a key operation, a display device 12, such as a CRT (cathode-ray tube), an LCD (liquid-crystal display), or the like, for displaying an image, and a printer 13 for forming an image on a recording sheet are connected to the host computer 18.

In the host computer 18, a memory 15 can input and temporarily store color-image data from the reader unit 11, the handy scanner 19 or the external storage device 20, and output the stored color-image data to the display device 12 or the printer unit 13. A data storage device 16, such as a hard disk, stores image data temporarily stored in the memory 15. A forgery determination unit 14 performs comparison/determination processing for image data input in the memory 15 or image data read from the data storage device 16 and transferred to the memory 15.

The forgery determination unit 14 includes a table which has registered in advance image patterns peculiar to specific originals, such as paper money, securities, and the like. Image patterns peculiar to a specific original includes, for example, a two-dimensional density distribution pattern peculiar to paper money, a histogram or an appearance-frequency distribution pattern of a specific color-component signal, and electronic watermark. The degree of coincidence of a transferred image pattern with each registered pattern is detected by a well-known method.

It is desirable to register in advance a plurality of patterns, such as characteristic patterns included, for example, in Japanese yen currency or U.S. dollar currency, and common patterns printed commonly in securities and various high-price bonds.

A CPU (central processing unit) 18a controls the entire computer 18. A ROM 18b stores a program representing the flowchart shown in FIG. 2, various other control programs, and parameters. A RAM (random access memory) 18c is used as working areas for various programs. The same device may be used for the memory 15 and the RAM 18c.

Next, the operation of the first embodiment will be described.

Figure 2:
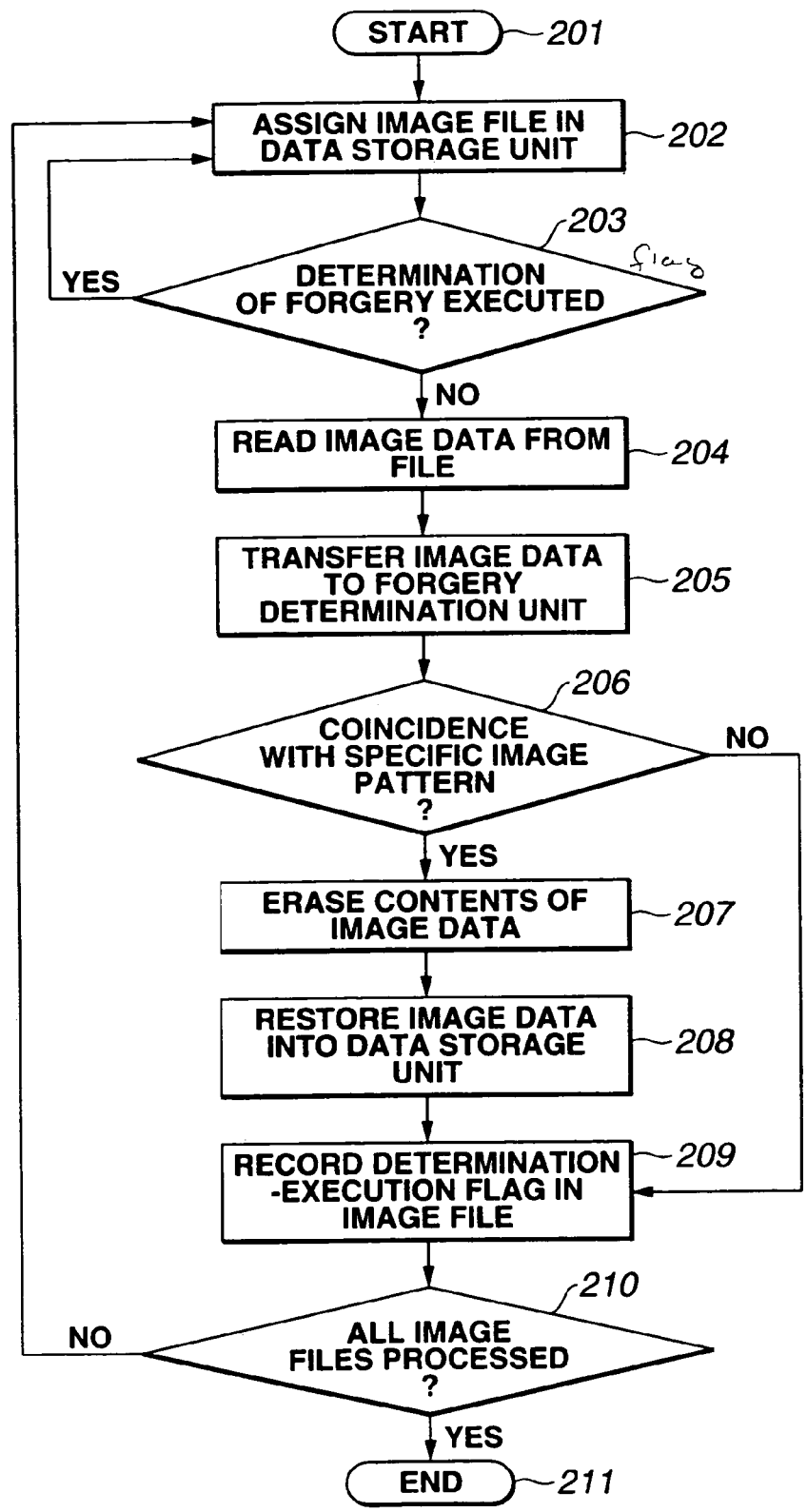
FIG. 2 is a flowchart illustrating a forgery determination operation according to the first embodiment.

FIG. 2 is a flowchart illustrating a forgery determination operation according to the first embodiment.

The operation described below is basically controlled by the CPU 18a and an OS (operating system). Timings for executing the operation will be described later.

When processing has started (step 201), the CPU 18a retrieves color-image files stored in the data storage unit 16, and assigns one image file (step 202).

Then, the CPU 18a determines if a flag indicating the execution of forgery determination (to be described later) is recorded in the assigned color-image file (step 203). If the result of the determination in step 203 is negative, color-image data is read from the file and is written in the memory 15 (step 204), and the image data is transferred to the forgery determination unit 14 (step 205).

Upon reception of the color-image data from the image memory 15, the forgery determination unit 14 compares the received color-image data with the image pattern of each of a plurality of specific originals. When coincidence with the image pattern of a specific original has been confirmed as a result of determination in step 206, it is determined that an image susceptible to be forged is stored in the file, and the contents of the image data are erased (altered) (step 207), and the color-image data whose contents have been erased is again stored in the data storage unit 16 with the same file name as the original image file (step 208).

At that time, a determination-execution flag indicating the execution of forgery determination is recorded in a specific region of the image file (step 209).

When it has been determined in step 206 that the color-image data does not coincide with a specific pattern, the data is not erased, and the process proceeds to step 209, where only a determination-execution flag is recorded in the corresponding image file of the data recording unit 16.

Then, it is determined if the above-described processing has been executed for all image files stored in the data storage unit 16 (step 210). If the result of the determination in step 210 is affirmative, the processing is terminated (step 211). If the result of the determination in step 210 is negative, the process returns to step 202, and the same processing is repeated for the next image file.

As described above, according to the first embodiment, by providing a forgery determination unit for determining forgery for all image data stored in a storage device of a host computer within the host computer, forgery determination processing can be performed.

Although timings for executing the processing shown in FIG. 2 has not been described, it is effective if the processing is executed by providing, for example, the following rules.

(1) Since the host computer does not perform various types of processing by always operating the CPU, processing is started when input from the keyboard is not provided for a certain period, and the CPU does not execute specific application software. When there is an input operation from the keyboard during the processing, the processing is temporarily interrupted. At a timing such that the above-described conditions are again satisfied, the interrupted processing is resumed for unfinished color-image data.

(2) When the power supply of the host computer is turned on from an off-state, an OS is first started. At this timing, processing from step 201 to step 211 is periodically executed as a part of the processing.

(3) When specific application software instructs reading of an image file of the data storage unit, processing from step 203 to step 207 is executed before reading the file into a working area used by the application software.

(4) When the user instructs an operation of copying a specific image file, for example, when copying a file on a hard disk to the same hard disk, or when copying a file from the hard disk to an external storage device, such as a floppy disk, a magnetooptical disk, or the like, or in cases reverse to the above-described cases, the OS executes processing from step 203 to step 207 for the image file to be copied, before executing the copying processing.

In this case, when coincidence with a specific image pattern is detected, for example, processing of stopping the execution of a copying operation by displaying a warning message on the display device 12 may be performed instead of erasing the image.

(5) Also when the user instructs to print a specific image file by the printer unit 13 through the keyboard 17 or a mouse, determination processing is performed in the same procedure as in the above-described item (4), and erasure of the image or stop of a printing operation is performed.

If determination processing is executed at the above-described plurality of timings or at all timings, forgery determination processing can also be assuredly executed for color-image data obtained according to various types of processing.

Second Embodiment

Figure 3:
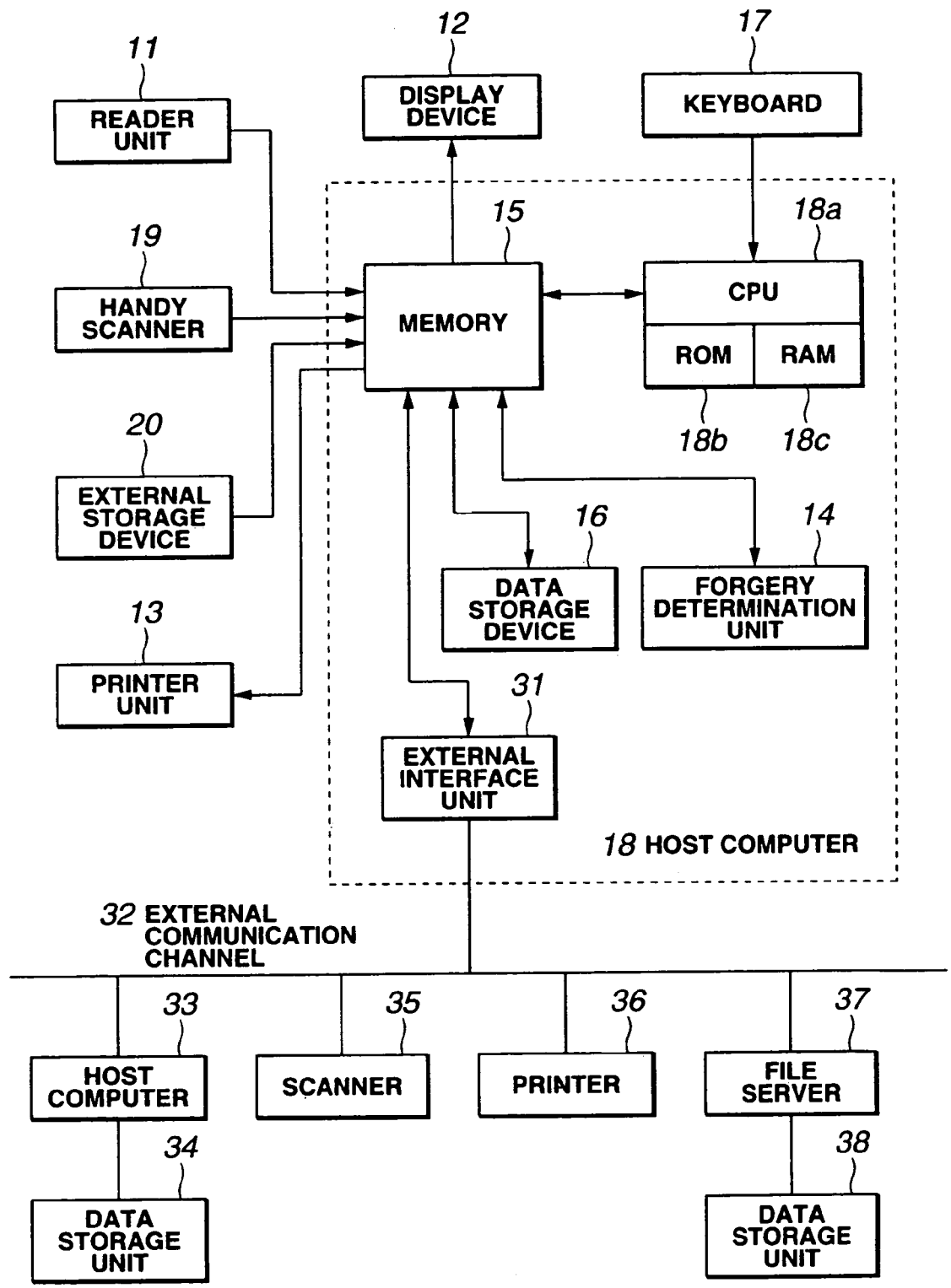
FIG. 3 is a block diagram illustrating a configuration according to a second embodiment of the present invention.

FIG. 3 is a block diagram illustrating a configuration according to a second embodiment of the present invention.

In FIG. 3, components 11 through 20 are the same as those shown in FIG. 1. An external interface unit 31 is added to the configuration shown in FIG. 1, and is connected to another host computer 33, a color scanner 35, a color printer 36, a file server 37, and the like, via an external communication channel 32 (in general, a network, such as Ethernet, Internet or the like, or a high-speed data transfer channel, such as IEEE 1394).

Although the host computer 33 and the file server 37 have the same basic internal configuration as the host computer 18, the host computer 33 and the file server 37 generally include data storage units 34 and 38, respectively.

The host computer 33 executes the forgery determination processing described in the first embodiment. In the configuration of the second embodiment, however, the forgery determination processing is also executed when moving image data via the external communication channel 32, or when inputting image data from the scanner 35, or when printing image data by the printer 36.

For example, when transferring an image file stored in the data storage unit 16 within the host computer 18 to the data storage unit 34 of the host computer 33 or the data storage unit 38 of the file server 37, the processing of steps 203-209 shown in FIG. 2 is executed by transmitting image data to the forgery determination unit 14 before the transfer of the image file.

In another example, when transferring an image file stored in the data storage unit 16 within the host computer 18 to the printer 36 in order to print the image file, the processing of steps 203-207 shown in FIG. 2 is executed by transmitting image data to the forgery determination unit 14 before the transfer of the image file.

Although in the foregoing description, only image files are determined, the determination processing is not limited to the image files. The determination processing may, of course, be performed for all of ordinary document files.

As for the internal structure of a file, image data itself is stored in various formats of storage whether the file is an image file or an ordinary document file, and necessity to extract necessary data by analyzing the file by an OS or application software always exists.

For example, there exists a TIFF format as a well-known image file format. In this format, the size and the date of formation of data, the image compression method, a comment peculiar to the data, and the like, are buried in the file in the form of tags. Accordingly, before transferring the data to the forgery determination unit 14, an OS or application software, of course, extracts and transfers only two-dimensional image data (bit-map data) by analyzing the file structure in advance.

Although in the foregoing embodiments, a configuration is provided in which, when it has been determined that data in a file coincides with a specific image pattern, the image data is erased, various modifications may be considered. For example, the color of the image data may be changed, or a character string, such as "sample", may be synthesized in the data in order to prevent output of forgery even if the specific pattern is printed by a printer.

Although the forgery determination unit 14 has been described as an independent component, this unit may, of course, be provided as a program in the ROM 18*b* so that image data in the memory 15 or the data storage unit 16 is directly accessed and determined.

It is possible to perform determination processing at a predetermined timing for color-image data stored in image storage means (a hard disk, or the like).

It is also possible to determine color-image data stored in a hard disk.

Since determination is performed at various timings, for example, when an operation of the operator is not provided for a predetermined period while application software periodically reads color-image data, when starting a color-image processing apparatus, when copying color-image data stored in image storage means to an external-storage device, when copying color-image data from an image storage device to an external storage device, and during communication of color-image data with an external apparatus connected via a network, it is possible to improve accuracy in determination. Particularly, although determination processing is interrupted, for example, when an operation of the operator has been started, or when a CPU has started execution of application software, processing is resumed from the immediately preceding determination processing when an operation of the operator is not provided for a predetermined period or when the CPU does not execute application software. Hence, it is possible to efficiently perform determination processing.

Since information indicating end of determination is added to color-image data which has been determined, it is possible to prevent occurrence of useless determination processing due to a plurality of determination operations for the same color-image data.

Other Embodiments

The present invention may also be applied to a processing method in which a program for operating the configuration of one of the above-described embodiments is stored in a storage medium in order to realize the functions of the embodiment, and the program stored in the storage medium is read in the form of codes and is executed by a computer, and to a storage medium storing the program.

For example, a floppy disk, a hard disk, an optical disk, a magnetooptical disk, a CD-ROM, a magnetic tape, a nonvolatile memory card, or a ROM may be used as the storage medium.

The present invention may be applied not only to the above-described case of executing processing only by the program stored in the storage medium, but also to a case of executing the operation of one of the above-described embodiments by operating in an OS in cooperation with the functions of other software or expanding board.

The individual components designated by blocks in the drawings are all well known in the image processing apparatus and method arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A color image processing apparatus comprising an operating system, means for obtaining color image data stored in image storage means and an image pattern of a specific document stored in pattern storage means, and determination means for checking the color image data with the image pattern, wherein said means for obtaining, the image storage means, the pattern storage means and said determination means are controlled by said operating system and said operating system periodically causes said determination means to perform the determination on the color image data stored in the image storage means, and wherein the image storage means stores color image data in accordance with a plurality of images, and said determination means records information indicative of termination of determination in determined color image data after checking the color image data.

2. A color image processing apparatus according to claim 1, wherein said color image processing apparatus is a computer and the image storage means is a hard disc.

3. A color image processing apparatus according to claim 2, wherein the color image data is stored in the image storage means as a file.

4. A color image processing apparatus according to claim 1, comprising alteration means for altering determined color image data when said determination means determines that the color image data coincides with the pattern.

5. A color image processing apparatus according to claim 1, wherein said determination means does not perform the determination on the color data in which information indicative of termination of termination of determination.

6. A color image processing apparatus according to claim 1, wherein the determination by said determination means is performed when there is no operational input by an operator for a predetermined period of time.

7. A color image processing apparatus according to claim 1, further comprising a CPU, wherein the determination by said determination means is performed when said CPU of said color image processing apparatus is not executing application software.

8. A color image processing apparatus according to claim 6, wherein determination processing by said determination means is resumed from color image data on which the determination by said determination means has not been performed after operational input by the operator, and when there is no subsequent operation by the operator again for a predetermined period of time.

9. A color image processing apparatus according to claim 7, wherein the determination by said determination means is resumed from color image data on which the determination by said determination means has not been performed after said CPU of said color image processing apparatus started to execute the application software and when said CPU of said color image processing apparatus is again not executing the application software.

10. A color image processing apparatus comprising means for obtaining color image data stored in image storage means and an image pattern of a specific document stored in pattern storage means, and determination means for checking the color image data with the image pattern,
wherein said determination means performs the determination when said color image processing apparatus is started, and
wherein the image storage means stores color image data in accordance with a plurality of images, and said determination means records information indicative of termination of determination in determined color image data after checking the color image data.

11. A color image processing apparatus according to claim 10, wherein said color image processing apparatus is a computer and the image storage means is a hard disc.

12. A color image processing apparatus according to claim 11, wherein the color image data is stored in the image storage means as a file.

13. A color image processing apparatus according to claim 10, further comprising alteration means for altering determined color image data when said determination means determines that the color image data coincides with the pattern.

14. A color image processing apparatus according to claim 10, wherein said determination means does not perform the determination on the color data in which information indicative of termination of determination has been recorded.

15. A color image processing apparatus according to claim 10, wherein the determination by said determination means is performed when there is no operational input by an operator for a predetermined period of time.

16. A color image processing apparatus according to claim 10, further comprising a CPU, wherein the determination by said determination means is performed when said CPU of said color image processing apparatus is not executing application software.

17. A color image processing method comprising the steps of:
obtaining color image data stored in image storage means and an image pattern of a specific document stored in pattern storage means; and
causing determination means to check the color image data with the image pattern,
wherein the image storage means, the pattern storage means and the determination means are controlled by an operating system and the operating system periodically performs said causing step to effect checking of the color image data stored in the image storage means, and wherein the image storage means stores color image data in accordance with a plurality of images, and said causing step further includes causing the determination means to record information indicative of termination of determination in determined color image data after checking the color image data.

18. A color image processing method according to claim 17, wherein said color image processing method is executed by a computer and the image storage means is a hard disc.

19. A color image processing method for use in a color image processing apparatus, comprising the steps of:
obtaining color image data stored in image storage means and an image pattern of a specific document stored in pattern storage means; and
causing determination means to check the color image data with the image pattern,
wherein the determination by the determination process is performed when the image processing apparatus is started, and
wherein the image storage means stores color image data in accordance with a plurality of images, and said causing step further includes causing the determination means to record information indicative of termination of determination in determined color image data after checking the color image data.

20. A color image processing method according to claim 19, wherein said color image processing method is executed by a computer and the image storage means is a hard disc.

21. A storage medium readable by a computer and storing, in executable form, a code for a determination process for checking color image data stored in image storage means of a color image processing apparatus and image pattern of a specific document stored in pattern storage means,
wherein the determination of the determining process is performed when the color image processing apparatus storing the color image data is started, and
wherein the image storage means stores color image data in accordance with a plurality of images, and the determination process includes recording information indicative of termination of determination in determined color image data after checking the color image data.

22. A storage medium according to claim 21, wherein the image storage means is a hard disc.

* * * * *

UNITED STATES PATENT AND TRADEMARK OFFICE
CERTIFICATE OF CORRECTION

PATENT NO. : 7,248,733 B2  Page 1 of 1
APPLICATION NO. : 11/113138
DATED : July 24, 2007
INVENTOR(S) : Ken-Ichi Ohta It is certified that error appears in the above-identified patent and that said Letters Patent is hereby corrected as shown below:

COLUMN 6

Line 67, "of termination of termination of determination" should read --of termination of determination has been recorded--.

Signed and Sealed this

Fifteenth Day of April, 2008

JON W. DUDAS
*Director of the United States Patent and Trademark Office*